(12) United States Patent
Graf et al.

(10) Patent No.: US 10,788,117 B2
(45) Date of Patent: Sep. 29, 2020

(54) DRIVE

(71) Applicant: AUMA Drives GmbH, Coswig (DE)

(72) Inventors: Holger Graf, Freital (DE); Frank Rebhahn, Dresden (DE); Michael Eleser, Grossenhain (DE)

(73) Assignee: AUMA DRIVES GMBH, Coswig (DE)

( * ) Notice: Subject to any disclaimer, the term of this patent is extended or adjusted under 35 U.S.C. 154(b) by 270 days.

(21) Appl. No.: 15/639,430

(22) Filed: Jun. 30, 2017

(65) Prior Publication Data

US 2018/0003284 A1 Jan. 4, 2018

(30) Foreign Application Priority Data

Jul. 4, 2016 (DE) .................. 10 2016 008 018

(51) Int. Cl.
| | |
|---|---|
| *F16H 57/022* | (2012.01) |
| *F16C 19/16* | (2006.01) |
| *F16C 19/36* | (2006.01) |
| *F16C 25/06* | (2006.01) |
| *F16C 33/61* | (2006.01) |
| *F16H 1/16* | (2006.01) |
| *F16H 57/039* | (2012.01) |
| *F16H 57/12* | (2006.01) |

(52) U.S. Cl.
CPC ......... *F16H 57/022* (2013.01); *F16C 19/166* (2013.01); *F16C 19/36* (2013.01); *F16C 25/06* (2013.01); *F16C 33/61* (2013.01); *F16H 1/16* (2013.01); *F16H 57/039* (2013.01); *F16H 57/12* (2013.01); *F16C 2229/00* (2013.01); *F16C 2361/61* (2013.01); *F16H 2057/0221* (2013.01); *F16H 2057/125* (2013.01)

(58) Field of Classification Search
CPC .... F16H 57/022; F16H 57/029; F16H 57/033; F16H 2057/125; F16H 2057/0221; F16H 1/16; F16C 19/166; F16C 25/06; F16C 33/61; F24S 2030/11; F24S 2030/15; F24S 2030/134; F24S 50/20
USPC ........................... 74/400, 416, 425; 384/513
See application file for complete search history.

(56) References Cited

U.S. PATENT DOCUMENTS

| | | | | |
|---|---|---|---|---|
| 829,658 | A * | 8/1906 | Strempel ................. | F16C 23/06 384/519 |
| 1,758,479 | A * | 5/1930 | Strempel ................. | F16C 23/06 384/583 |

(Continued)

OTHER PUBLICATIONS

Franke: General catalog—roller bearing, linear systems, product catalog 2013, pp. title, 3-5, 12, 13, 19, 22-25, 29, 52, 53, 58-60, 63, rear cover page, URL: https://files.vogel.de/vogelonline/vogelonline/companyfiles/6823.pdf [online]. [recalled on May 3, 2017], (2013).

(Continued)

*Primary Examiner* — Jake Cook
*Assistant Examiner* — T. Scott Fix
(74) *Attorney, Agent, or Firm* — Volpe and Koenig, P.C.

(57) ABSTRACT

A drive (1) with a housing (2) and a toothed part (4) which is mounted rotatably relative thereto with a wire race bearing (15), wherein a threaded ring (23) is screwed onto the housing (2) or the toothed part (4), said threaded ring axially fixing the wire race bearing (15) and permitting an adjustment.

15 Claims, 2 Drawing Sheets

(56) References Cited

U.S. PATENT DOCUMENTS

| | | | | |
|---|---|---|---|---|
| 3,543,367 | A | * | 12/1970 | Arnot .................... F16C 19/163 |
| | | | | 29/434 |
| 3,946,490 | A | | 3/1976 | Sotman et al. |
| 5,834,662 | A | * | 11/1998 | Stoll ....................... B66C 23/84 |
| | | | | 74/425 |
| 8,443,684 | B2 | * | 5/2013 | Thorwart ................ F15B 15/12 |
| | | | | 384/513 |
| 2013/0343691 | A1 | * | 12/2013 | Kwasniewski ....... F16H 57/022 |
| | | | | 384/583 |
| 2014/0174502 | A1 | * | 6/2014 | Lucas Morata ........... F16H 1/16 |
| | | | | 136/246 |

OTHER PUBLICATIONS

IBC: High-precision clamping nuts. Product catalog 2013, pp. title, 3-9, 15, 20. URL: http://www.ibc-waelzlager.eu/file/kataloge/235349_IBC_Hoch-Spannmuttern_DEUTSCH.pdf [online]. [recalled on May 5, 2017], (2013).

Wikipedia—The Free Encyclopedia: Slewing drive, Online-database, Jul. 15, 2015, pp. 1-3. URL: https://en.wikipedia.org/w/index.php?title=Slewing_drive&oldid=671530983 [online]. [recalled on May 5, 2017], (Jul. 5, 2015).

IIMO: IMO Slew Drives—IMO Slew drives, Youtube video—freeze frames 0:34, 0:36, May 29, 2013, pp. 1-2. URL: https://www.youtube.com/watch?v=1TN7gOXTBFo [online]. [recalled on May 5, 2017], (May 29, 2013).

* cited by examiner

DRIVE

BACKGROUND

The invention relates to a drive with a toothed part and a housing part, wherein a wire race bearing is arranged between the housing part and the toothed part, and the housing part closes or covers the wire race bearing to the outside.

Arrangements of this type are known from the mounting of worm wheels in worm gears, wherein the wire race bearing on the inner bearing and the cover/flange are typically screwed together by the worm wheel. However, this requires different individual parts of the toothed part or flange to be retained in order to permit a different adjustment of the prestress or of the play of the wire race bearing. The invention intends to avoid this disadvantage.

SUMMARY

It is therefore the object of the invention to provide a drive of the aforementioned type which can be produced more simply and more cost-effectively.

This object is achieved by a drive with one or more features of the invention. In the case of a drive of the type described at the beginning, it is therefore provided in particular according to the invention that a threaded ring is screwed onto the toothed part, said threaded ring axially fixing the wire race bearing and permitting an adjustment. In another embodiment, the threaded ring can also be screwed into the housing part. In both cases, the toothed part can be formed as a single part at least in the region of the wire race bearing. The bearing is adjusted by means of the threaded ring. The threaded ring permits an infinitely variable adjustment of the wire race bearing. By contrast, in the prior art, this has been possible only in discrete steps by selection of the parts.

In addition, various parts of the toothed part or of the flange do not have to be retained and selected. The drive with the construction according to the invention of the toothed part can therefore be produced overall more simply and cost-effectively and more diversely in use.

In an advantageous embodiment of the invention, the toothed part has a first axial stop for the wire race bearing, and the toothed part has a thread into which a threaded ring is screwable, said threaded ring having a second axial stop for the wire race bearing, and therefore the wire race bearing is fixed on the toothed part between the two axial stops.

In a further embodiment, the housing has a first axial stop for the wire race bearing, and the housing has a thread into which the threaded ring is screwable, said threaded ring having a second stop for the wire race bearing, and therefore the wire race bearing is fixed in the housing between the two axial stops.

The threaded ring expediently has a recess for receiving the wire race bearing, in which recess the wire race bearing fits both axially and radially.

In the case of wire race bearings, the ball cage frequently protrudes axially over the wire races. For this reason, it is expedient if the axial stop has an axial recess for the ball cage, and therefore the balls are freely movable.

In particular, it is expedient if the second axial stop on the threaded ring is formed by an axial projection. The projection reaches here in the radial direction only as far as the wire race, and therefore a possibly protruding ball cage does not fit.

It is therefore advantageous if the axial projection is spaced apart in the radial direction from both radial ends of the threaded ring and, for example, lies between said ends.

Depending on the use of the drive, the threaded ring may become detached due to transmitted vibrations. In order to prevent this, it is advantageous if there is a fixing element with which the threaded ring is fixable in its axial position.

In an expedient embodiment of the invention, there is a radial threaded bore as fixing element on the threaded ring, through which radial threaded bore a fixing screw is screwable radially against the toothed part. In a further type of embodiment, the fixing screw can be screwable radially against the housing. It may also be advantageous here, as the drives rotate, if a plurality of fixing elements are arranged distributed on the circumference of the threaded ring.

Depending on the constructional form of the housing and type of drive, it is necessary or expedient for the threaded ring to be placed first into the housing and only then for the toothed part to be screwed thereon.

It may therefore be advantageous if there is a locking arrangement with which the threaded ring is securable against rotation. It is therefore possible to prevent the threaded ring from rotating as the toothed part is screwed in. Such a locking arrangement can be configured in diverse ways. For example, a screw or a latching element acting on the threaded ring in the axial or radial direction and locking the latter can be arranged on the housing. This locking is only necessary during the assembly and has to be removed or released for normal operation.

In a further type of embodiment, it may be advantageous if the toothed part is first of all placed together with the wire race bearing into the housing and then the threaded ring is screwed onto the housing.

It may therefore be advantageous if the housing has a possibility of fixing against co-rotation. The housing therefore cannot rotate as the threaded ring is screwed in.

In a particularly advantageous embodiment of the invention, the housing has at least one opening which is accessible from the outside and into which a locking element is insertable, with which the threaded ring is securable against rotation.

It is particularly expedient here if the threaded ring has at least one locking device in which the locking element engages. As a result, the holding force is not applied solely by friction, and the holding of the threaded ring is simpler and possible without effort.

For this purpose, the locking device can be formed on the threaded ring as a recess or a projection or in some other way by means of shaping.

In order to seal the drive, it is advantageous if a seal is arranged between the housing and the toothed part. Said seal can be formed in particular by a shaft sealing ring.

The integral design of the toothed part in the region of the wire race bearing can comprise, for example, an intermediate space, which receives the wire race bearing, between the housing part and the toothed part being closed or sealed to the outside by a shaft sealing ring, wherein the shaft sealing ring acts at least on an integrally formed part on the toothed part.

The wire race bearing can be any wire race bearing. In particular, it is expedient if the wire race bearing is designed as a four-point bearing.

The drive according to the invention can be designed in diverse ways for different applications. In an expedient embodiment of the invention, the drive is designed as a worm gear drive and the toothed part is designed as a worm wheel of the worm gear.

In an advantageous embodiment of the invention, a drive can be assembled in accordance with the following method:
    placing the threaded ring including a wire race of the wire race bearing into the housing
    locking the threaded ring with a locking element
    placing in the ball/cage assembly and 2 further wire races
    screwing the toothed part including a wire race into the threaded ring as far as the desired clamping of the wire race bearing.

In a further advantageous type of embodiment of the invention, the drive can be assembled in accordance with the following method:
    placing a wire race into the housing
    locking the housing
    placing the toothed part and the remaining components of the wire race bearing
    screwing the threaded ring onto the housing.

In this connection, the locking permits large torques or forces to be absorbed during the clamping of the wire race bearing.

Subsequently, the following steps can be carried out:
    axially fixing the threaded ring with a fixing device
    releasing the locking element.

This permits the threaded ring to be fixed in the desired clamping position without play. The use of a fixing device makes it possible for the threaded ring to remain in the set clamping position.

BRIEF DESCRIPTION OF THE DRAWINGS

The invention is explained in more detail below using an exemplary embodiment with reference to the attached drawings, in which.

DETAILED DESCRIPTION OF THE PREFERRED EMBODIMENTS

Figure 1:
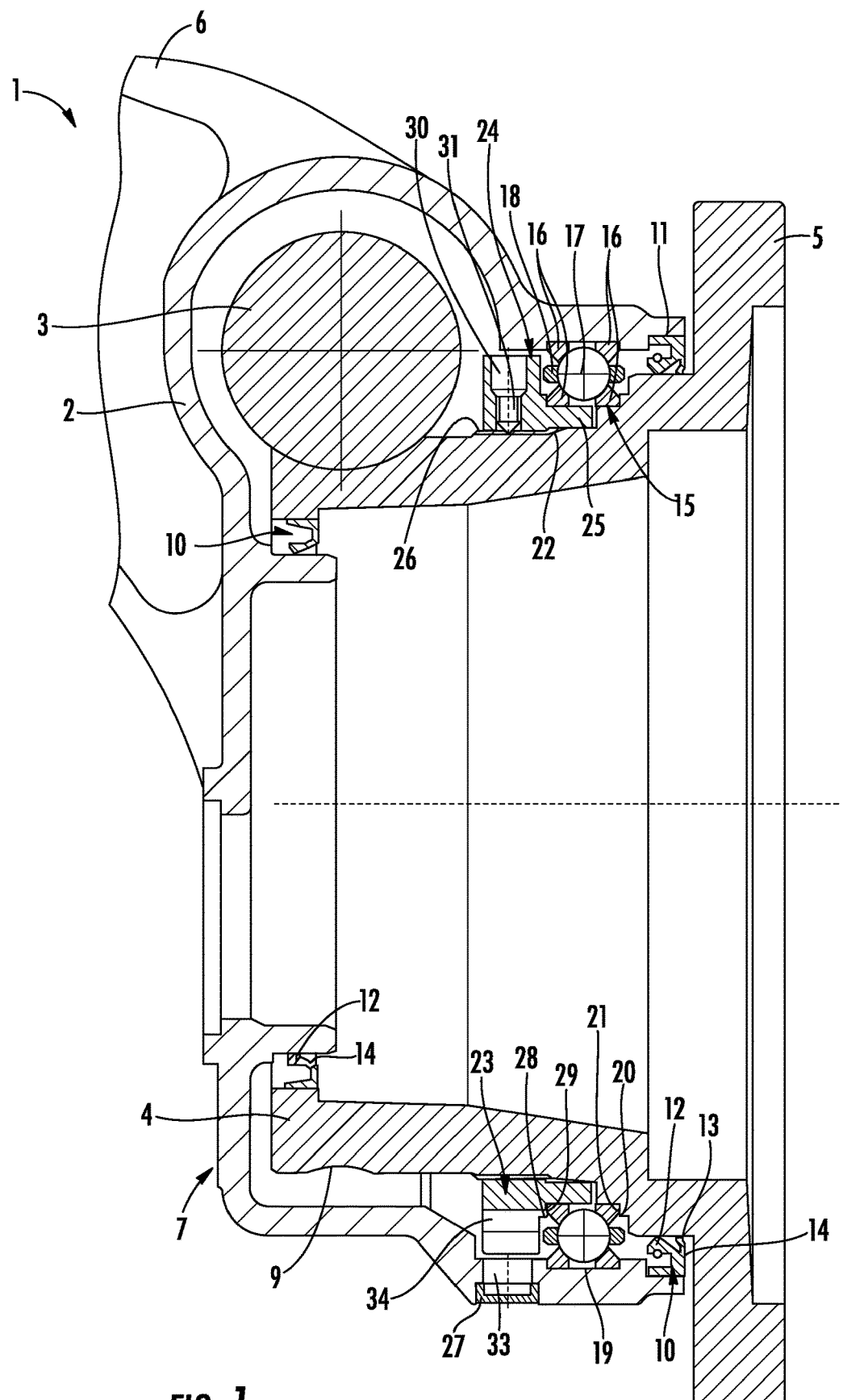
FIG. 1 shows a sectional view of a worm gear drive according to the invention.

FIG. 1 shows a drive according to the invention which is designed as a worm gear drive 1. The worm gear 1 has a housing 2 in which a worm shaft 3 and a worm wheel 4 as the toothed part are arranged.

In the example, the worm gear drive 1 is designed for tracking a solar system. Said solar system can be, for example, a photovoltaic system, a solar collector or a solar mirror which concentrates solar radiation onto one point. However, the invention is not restricted to the embodiment and use shown.

In this embodiment, the worm wheel 4 is secured against rotation and has a flange 5 for fastening to a base, a roof or another suitable underlying surface or framework. The worm wheel 4 is designed as a single part.

The housing 2 is of substantially cup-shaped design apart from a receiving region for the worm shaft 3 and a mount 6 for the solar system. The housing 2 has a closed end 7 and an opening 8. The worm wheel 4 is arranged in the housing 2, wherein the toothing 9 lies at the closed end 7 of the housing 2 and is in engagement there with the worm shaft 3.

A seal which prevents dirt and moisture from penetration the interior of the housing and the escape of lubricating substances is arranged on the opening 8 of the housing 2. Said seal is formed in the example by a shaft sealing ring 10 which is arranged or clamped in an encircling sealing groove 11 on the inner circumference of the opening of the housing 2. The shaft sealing ring 10 has a sealing lip 12 which interacts with a sealing surface 13 of the worm wheel 4. The shaft sealing ring 10 furthermore has a dust lip 14 which interacts with the flange 5. Of course, the sealing can also be undertaken in another manner.

A wire race bearing 15 for the rotational mounting is arranged between the worm wheel 4 and the housing 2. In the example, the wire race bearing 15 in the region of the housing opening 8 is arranged on the inner side of the shaft sealing ring 10.

In the example, the wire race bearing 15 is designed as a four-point bearing. This means that the wire race bearing 15 has four wire races 16 which are each arranged in the corners of a rectangular cross section. The balls 17 of the wire race bearing 15 run within said four wire races 16 and are additionally held by a ball cage 18. The ball cage 18 protrudes over the wire races 16 on both sides in the axial direction. In addition to the four-point wire race bearing 15 shown here, there are also other wire race bearings which could alternatively be used here. The invention is therefore not restricted solely to the embodiment shown.

An encircling bearing groove 19 into which the wire race bearing 15 is placed is arranged on the inner circumference of the housing 2. As a result, the two radially outer wire races 16 of the wire race bearing 15 are secured axially and radially. The bearing groove 19 is only of such a depth in the radial direction that the wire races 16 are overlapped radially, and the protruding ball cage 17 is not touched.

The worm wheel 4 has an axial step 20 which forms a first axial stop 21 for the wire race bearing 15. The wire race 16 of the wire race bearing 15, the wire race pointing radially inward and axially toward the opening, lies axially against said first stop 21. This axial step 20 likewise protrudes radially only as far approximately as the wire race 16 so that the axially protruding ball cage 18 is not touched. Radially, said wire race 16 lies against the worm wheel 4.

Furthermore, an outer thread 22 into which an approximately L-shaped threaded ring 23 is screwed is arranged on the worm wheel 4. The threaded ring 23 has a base 24 which is arranged at the axially inwardly pointing end of the threaded ring 23, and a limb 25 which points axially toward the housing opening 8. An inner thread 26 which is screwed onto the outer thread 22 of the worm wheel 4 is arranged on the base 24.

The threaded ring 23 has, between base 24 and limb 25, an axial step 28 which forms a second axial stop 29 against which the radially and axially inner wire race 16 of the wire race bearing 15 lies axially. The axial step 28 reaches radially only as far approximately as the wire race 16, and therefore there is space for the protruding ball cage 18. Radially, the wire race 16 lies against the limb 25.

The threaded ring 23 has a depression 34 in its base 24. A locking opening 33 which can be brought into overlap with the depression is arranged in the housing 2. A locking pin 32 can be brought through the locking opening 33 into engagement in the depression 34 of the threaded ring in order to fix the threaded ring 32 in relation to the housing 2.

In order to fix the axial position of the threaded ring 23, the threaded ring 23 has one or more radial threaded bores 30 in the region of the thread, into which threaded bores a threaded pin 31 is screwable from the outside. The threaded pin 31 acts radially on the outer circumference of the housing 2, and therefore the threaded ring 23 is secured against rotation. The threaded pin 31 or another fixing device is already preassembled on the threaded ring 23 without touching the thread 22, or it is inserted through the locking opening 33 or another opening in the housing.

Tightening of the threaded pin 31 prevents an inadvertent rotation of the threaded ring 23, as may take place, for example, due to vibrations. As a result, the axial position of the threaded ring 23 is fixed and prevents the adjustment of the wire race bearing 15 from changing. There are preferably a plurality of threaded pins 31 distributed on the circumference.

By rotation of the worm wheel 4, the axial position of the threaded ring 23 and of the worm wheel 4 with respect to each other changes. The distance between the two axial stops 21, 29 thereby changes. The two radially inner wire races 16 are therefore pressed together more or less in the axial direction by rotation of the threaded ring 23, as a result of which the wire race bearing 15 can be adjusted in a simple manner. A torsional resistance or a play is thereby adjusted in order, for example, to increase tilting resistance.

The housing 2 covers the wire race bearing 15 to the outside and thus prevents soiling of the bearing and an escape of lubricating substances.

The worm gear 1 which is shown can be assembled, for example, as follows. First of all, the threaded ring 23, with wire races 16 of the wire race bearing 15 placed thereon, is placed loosely into the housing 2. The threaded ring 23 is then secured against rotation in relation to the housing 2 by a locking arrangement.

Next, the ball cage 18 and the remaining wire races 16 of the wire race bearing 15 are placed into the encircling groove 19 in the housing 2 and the shaft sealing ring 10 is placed into the housing 2. The worm wheel 4 on which a wire race 16 lies is then screwed into the threaded ring 23. The first stop 21 acts here on the wire race bearing 15 and presses the latter against the second stop 29 on the threaded ring. The screw connection takes place until the desired clamping in the wire race bearing 15 is achieved. The locking pin 32 can then be removed. Subsequently, the threaded ring 23 is secured in its axial position with respect to the worm wheel 4 via the threaded pins 31 in the threaded ring 23. Finally, the locking opening 33 can be closed with a closure cap 27 in order to prevent dirt and liquid from penetrating or lubricating substances from escaping. Finally, the worm wheel 4 of the worm gear 1 assembled in this manner can be fastened with the flange 5 on a mount or the like.

At the closed end 7 of the housing 2, a shaft sealing ring 10 is also arranged between the housing 2 and the worm wheel 4, said shaft sealing ring preventing dirt from penetrating and lubricating substances from emerging.

The invention describes a drive 1 with a housing 2 and a toothed part 4 which is mounted rotatably relative thereto with a wire race bearing 15, wherein a threaded ring 23 is screwed onto the housing 2 or the toothed part 4, said threaded ring axially fixing the wire race bearing 15 and permitting an adjustment.

Figure 2:
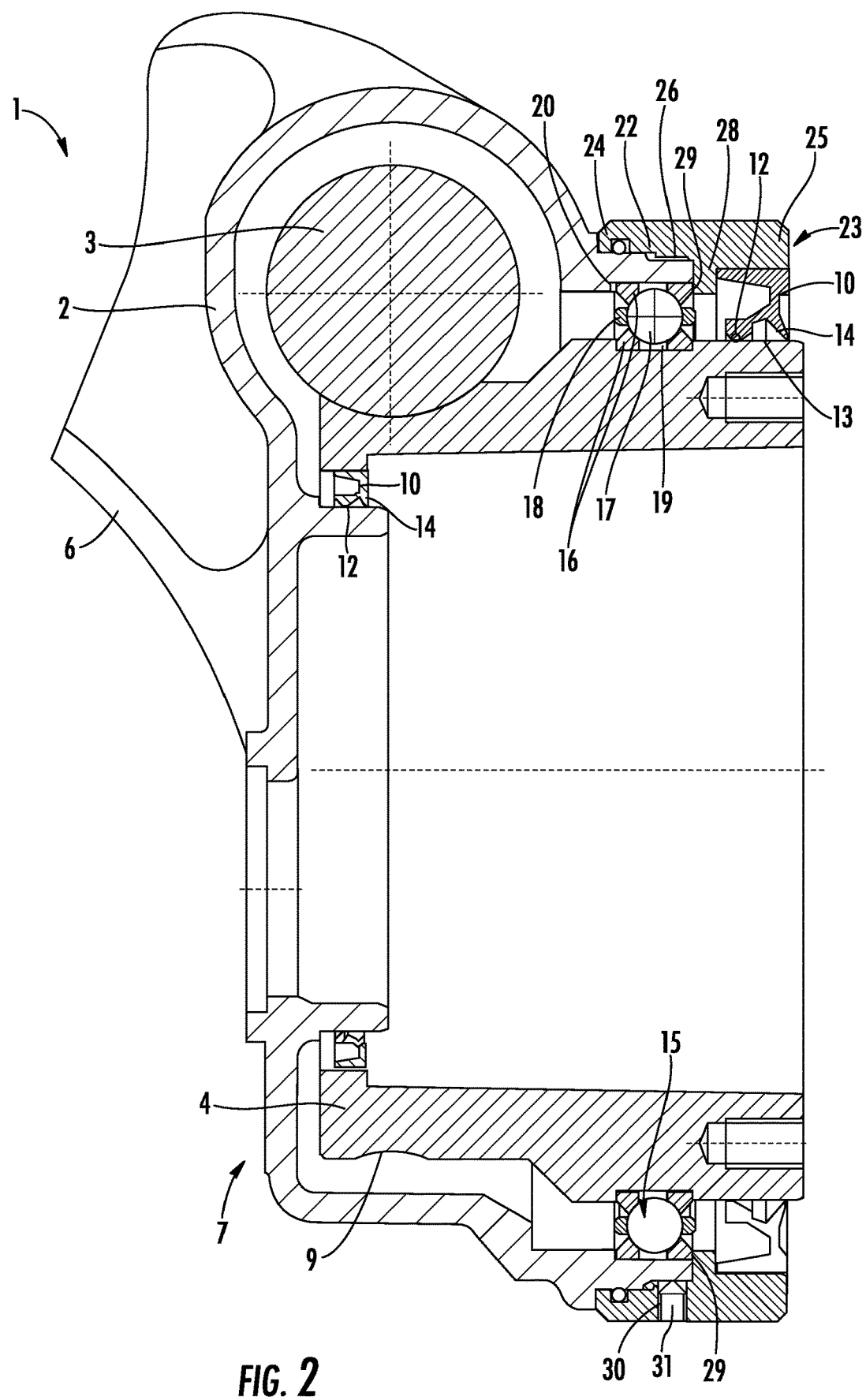
FIG. 2 shows a sectional view of a further worm gear drive according to the invention.

FIG. 2 shows a further worm gear 1 according to the invention. The worm gear 1 shown here has all of the features of the worm gear 1 of FIG. 1, and therefore the same features are provided with the same reference numbers here.

However, in contrast to the embodiment of FIG. 1, the threaded ring 23 is screwed here onto the outside of the housing 2.

An encircling bearing groove 19 into which the wire race bearing 15 is placed is arranged on the outer circumference of the worm wheel 4. As a result, the two radially inner wire races 16 of the wire race bearing 15 are secured axially and radially. The bearing groove 19 is only of such a depth in the radial direction that the wire races 16 are overlapped radially, and the protruding ball cage 18 is not touched.

The housing 2 has an axial step 20 which forms a first axial stop 21 for the wire race bearing 15. The radially outwardly and axially inwardly pointing wire race 16 of the wire race bearing 15 lies axially against said first stop 21. Said axial step 20 likewise protrudes radially only as far approximately as the wire race 16 so that the axially protruding ball cage 18 is not touched. Radially, said wire race 16 lies against the housing 2.

Furthermore, an outer thread 22 onto which a threaded ring 23 is screwed is arranged on the housing 4. The threaded ring 23 has a base 24 which is arranged at the axially inwardly pointing end of the threaded ring 23, and a limb 25 which points axially toward the housing opening 8. An inner thread 26 which is screwed onto the outer thread 22 of the housing 2 is arranged on the base 24.

The threaded ring 23 has, between base 24 and limb 25, an axial step 28 which forms a second axial stop 29, against which the radially and axially outer wire race 16 of the wire race bearing 15 bears axially. The axial step 28 reaches radially only as far approximately as the wire race 16, and therefore there is space for the protruding ball cage 18. Radially, the wire race 16 lies against the limb of the threaded ring 25.

In the embodiment of FIG. 2, the axial position of the threaded ring 23 with respect to the housing 2 changes by rotation of the threaded ring 23. The two radially outer wire races 16 are therefore pressed together more or less in the axial direction by rotation of the threaded ring 23, as a result of which the wire race bearing 15 can be adjusted in a simple manner.

Arranged in the region of the thread 22 in the threaded ring 23 is a radial threaded bore 30 into which a threaded pin 31 is screwed as fixing means, said threaded pin pressing radially onto the housing 4. The threaded bore 30 can be reached from the outside. The threaded pin 31 or a different fixing device can be preassembled on the threaded ring 23 without touching the thread 22. By tightening of the threaded pin 31, an inadvertent rotation of the threaded ring 23, as may take place, for example, due to vibrations, is prevented. As a result, the axial position of the threaded ring 23 is fixed and prevents the adjustment of the wire race bearing 15 from changing.

A seal which prevents dirt and moisture from penetrating the interior of the housing and lubricating substances from escaping is arranged on the opening 8 of the housing 2. This seal is formed in the example by a shaft sealing ring 10 which is arranged or clamped in an encircling sealing groove 11 on the inner circumference of the limb of the threaded ring 23. The shaft sealing ring 10 has a sealing lip 12 which interacts with a sealing surface 13 of the worm wheel 4.

LIST OF REFERENCE NUMBERS

1 Worm gear drive
2 Housing
3 Worm shaft
4 Worm wheel
5 Flange
6 Mount
7 Closed end
8 Housing opening
9 Toothing
10 Shaft sealing ring
11 Sealing groove
12 Sealing lip
13 Sealing surface
14 Dust lip 15 Wire race bearing
16 Wire races
17 Balls
18 Ball cage
19 Bearing groove
20 Axial step in the worm wheel/housing
21 First axial stop
22 Outer thread
23 Threaded ring
24 Base
25 Limb
26 Inner thread
27 Closure cap
28 Axial step in the threaded ring
29 Second axial step
30 Threaded bore
31 Threaded pin
32 Locking pin
33 Locking opening
34 Depression

The invention claimed is:

1. A drive (1) comprising:
   a toothed part (4) including an outer thread (22),
   a housing (2),
   a wire race bearing (15) arranged between the housing (2) and the toothed part (4) such that the housing (2) and the toothed part (4) are rotatable relative to each other, and the housing (2) surrounds an outer surface of the wire race bearing (15),
   a threaded ring (23) that is screwed onto the outer thread (22), said threaded ring (23) axially fixing the wire race bearing (15) and permitting an adjustment, and
   a locking element (32) with which the threaded ring (23) is securable against rotation in relation to the housing (2).

2. The drive (1) as claimed in claim 1, wherein the toothed part (4) has a first axial stop (21) for the wire race bearing (15), said threaded ring having a second axial stop (29) for the wire race bearing (15) that fixes the wire race bearing (15) on the toothed part (4) between the two axial stops (21, 29).

3. The drive (1) as claimed in claim 2, wherein the second axial stop (29) on the threaded ring (23) is formed by an axial projection (28).

4. The drive (1) as claimed in claim 3, wherein the axial projection (28) is spaced apart in a radial direction from a radial end of the threaded ring (23).

5. The drive (1) as claimed in claim 1, further comprising a fixing device on the toothed part (4) or on the threaded ring (23) to axially fix the threaded ring (23).

6. The drive (1) as claimed in claim 1, wherein the threaded ring (23) has at least one locking device (34) in which the locking element (32) engages.

7. The drive (1) as claimed in claim 1, further comprising a shaft sealing ring (10) arranged between the housing (2) and the toothed part (4) or between threaded ring (23) and toothed part (4).

8. The drive (1) as claimed in claim 1, wherein the wire race bearing (15) is a four-point bearing.

9. The drive (1) as claimed in claim 1, wherein the drive is a worm gear drive (1).

10. The drive (1) as claimed in claim 1, wherein the housing (2) has a first axial stop (21) for the wire race bearing (15), said threaded ring having a second axial stop (29) for the wire race bearing (15) that fixes the wire race bearing (15) in the housing (2) between the two axial stops (21, 29).

11. The drive (1) as claimed in claim 1, wherein there is a radial threaded bore (30) on the toothed part (4) or on the housing (2), through which threaded bore a threaded pin (31) is screwable radially against the threaded ring (23).

12. The drive (1) as claimed in claim 1, wherein the housing (2) has at least one opening (33) which is accessible from the outside and into which a locking element (32) is insertable, with which locking element the threaded ring (23) is securable against rotation in relation to the housing (2).

13. The drive (1) as claimed in claim 1, wherein the locking device comprises a recess (34) or a projection.

14. The drive (1) as claimed in claim 1, wherein the toothed part is designed as a worm wheel (4) of a worm gear.

15. The drive (1) as claimed in claim 1, further comprising an inner thread (26) on a base (24) of the threaded ring (23) that is screwed onto the outer thread (22).

* * * * *